(12) United States Patent
Hurla et al.

(10) Patent No.: US 12,710,260 B2
(45) Date of Patent: Aug. 18, 2026

(54) METHOD AND SYSTEM FOR TESTING THE ROUNDNESS OF THE INNER WALL OF A PIPE OR OTHER HOLLOW CYLINDER

(71) Applicant: Insulation Technology Corporation, Frederick, CO (US)

(72) Inventors: Shawn Hurla, Platteville, CO (US); Ryan Dwyer, Thornton, CO (US); Ray Lavallee, Mead, CO (US)

(73) Assignee: Insulation Technology Corporation, Frederick, CO (US)

( * ) Notice: Subject to any disclaimer, the term of this patent is extended or adjusted under 35 U.S.C. 154(b) by 332 days.

(21) Appl. No.: 17/899,929

(22) Filed: Aug. 31, 2022

(65) Prior Publication Data

US 2023/0064475 A1 Mar. 2, 2023

Related U.S. Application Data

(60) Provisional application No. 63/239,779, filed on Sep. 1, 2021.

(51) Int. Cl.
*G01B 5/20* (2006.01)
*G01B 5/30* (2006.01)

(52) U.S. Cl.
CPC .............. *G01B 5/201* (2013.01); *G01B 5/30* (2013.01)

(58) Field of Classification Search
None
See application file for complete search history.

(56) References Cited

U.S. PATENT DOCUMENTS 4,354,379 A * 10/1982 Miner .................. E21B 17/006 33/DIG. 2
6,997,044 B1 * 2/2006 Maciejewski ....... G01M 3/2846 73/49.8

FOREIGN PATENT DOCUMENTS

JP 2003039034 A * 2/2003

* cited by examiner

*Primary Examiner* — Daniel S Larkin
(74) *Attorney, Agent, or Firm* — Stanley J. Gradisar Attorney At Law, LLC; Stanley J. Gradisar

(57) ABSTRACT

A drift is inserted into a first end of a first pipe and a first actuator is pressed against a second end of the first pipe. A valve in the first actuator is opened and a valve in a second actuator is closed. When a vacuum is turned on, suction is applied to the first actuator, drawing the drift through the first pipe. The drift is removed from the second end and inserted into a second end of a second pipe. The second actuator is pressed against a first end of the second pipe. The valve in the first actuator is closed, the valve in the second actuator is opened, and suction is applied, drawing the drift through the second pipe. The back-and-forth process is repeated for each of a number of pipes. If the drift encounters an obstruction, the pipe can be set aside for further inspection.

7 Claims, 3 Drawing Sheets

112
116A
116

116
112

116A
114
114A

METHOD AND SYSTEM FOR TESTING THE ROUNDNESS OF THE INNER WALL OF A PIPE OR OTHER HOLLOW CYLINDER

CROSS-REFERENCE TO RELATED APPLICATIONS

The present application claims the benefit of commonly-owned and U.S. Provisional Application Ser. No. 63/239,779, entitled METHOD AND SYSTEM FOR TESTING THE ROUNDNESS OF THE INNER WALL OF A PIPE OR OTHER HOLLOW CYLINDER, and is related to commonly-owned and U.S. application Ser. No. 29/806,227, entitled APPARATUS FOR TESTING THE ROUNDNESS OF THE INNER WALL OF A PIPE OR OTHER HOLLOW CYLINDER, both applications filed on Sep. 1, 2021, and both incorporated herein by reference.

TECHNICAL FIELD

The present invention relates generally to the oil field industry and, in particular, to testing for obstructions on, and the roundness of, the inner wall of a pipe or other cylinder to ensure that it meets a predetermined standard.

BACKGROUND ART

In a number of industries, it is important to be sure that the inside walls of a pipe or tube are free of debris, dents, and other obstructions and that the inside diameter is within a particular tolerance. For example, in the oil field industry, workers pass a cylinder, sometimes called a “drift,” of a specified diameter through a pipe. If the drift passes through cleanly, the pipe is cleared for use. If the drift hangs up within the pipe, the pipe is set aside for cleaning if possible or recycled/disposal if it cannot be restored.

One of the methods used to pass the drift through a pipe is to pull or push it. It may also be dropped through the pipe. If the drift encounters an obstruction, it may be pushed or pulled back out.

SUMMARY OF THE INVENTION

Embodiments of the present invention provide a system and method for testing the roundness of the inner wall of a pipe or other hollow cylinder. The system comprises first and second actuators and at least one valve between a vacuum source and the actuators. Each actuator comprises a coupler, an extension tube securable at an outer end to an inner end of the coupler, and a plate attachable to an inner end of the extension tube, the plate having an opening formed therethrough. When a drift is inserted into a first end of a pipe, the plate of the first actuator is pressed against a second end of the pipe, and a vacuum is applied to the first actuator, the drift is drawn through the pipe from the first end towards the second end. When the drift is then inserted into the second end of a second pipe, the plate of the second actuator is pressed against the first end of the second pipe, a vacuum is applied to the second actuator, and the drift is drawn through the second pipe from the second end towards the first end. The process is repeated to successive pipes. If the drift is unable to pass through a pipe because of debris, internal damage, or other obstacle, that pipe is removed from the line for further inspection, cleaning, repair, or other corrective work.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
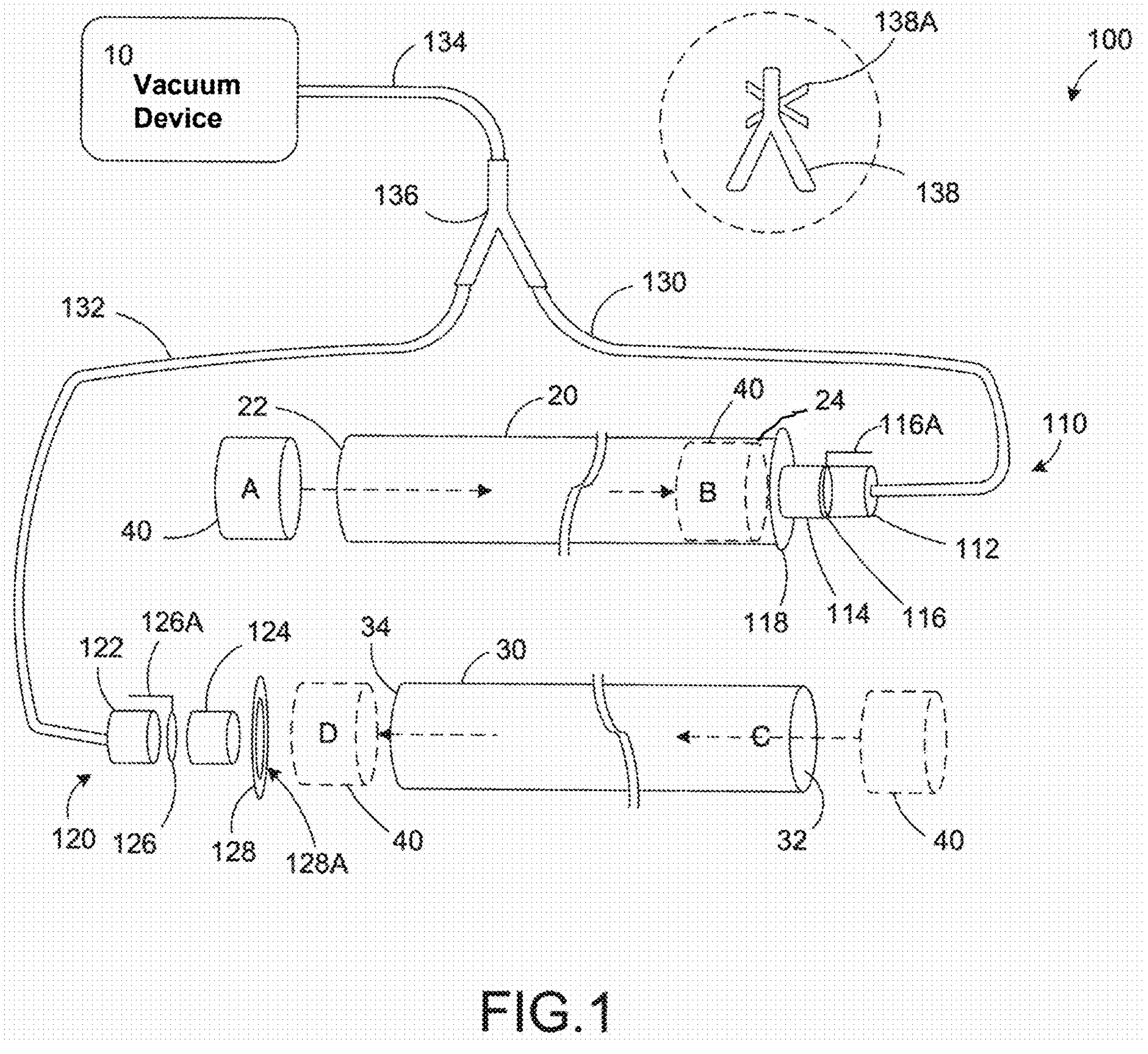
FIG. 1 illustrates an embodiment of a drift test system of the present invention.

For testing the insides of a number of pipes or other hollow cylinders (collectively referred to as “pipes”), it is efficient, though not required, for the pipes to be arrayed parallel and in close proximity to each other (as represented in FIG. 1). For purposes of consistency in this description, the ends of the pipes at one end of the array of pipes will be referred to as the “first end” and the ends at the opposite end of the array will be referred to as the “second end.”

In accordance with one embodiment of the present invention, a close-fitting drift is inserted into a first end of a first pipe. A vacuum device is connected to a second, opposite end of the first pipe. When the vacuum is turned on, the drift is drawn through the pipe from the first end to the second end. A vacuum is then applied to the first end of an second pipe and the drift inserted into the second end to be drawn back through to the first end of the second pipe. The back-and-forth pipe-to-pipe process is repeated until each of the pipes has been tested. If the drift encounters an obstruction within a pipe, the drift may be removed and that pipe can be set aside for further inspection and any necessary corrective work.

FIG. 1 illustrates one embodiment of a system 100 for testing for obstructions on, and the roundness of, the inner wall of a pipe or other cylinder 20, 30, which is also referred to herein as the “drift test system” or simply the “system.” The system 100 includes two actuators 110, 120 which are connectable to a vacuum device 10 through separate hoses 130, 132, respectively. The first actuator 110 is shown as assembled and the second actuator 120 is shown with the components separated. The vacuum device 10 will typically only have a single vacuum port. Consequently, the hoses 130, 132 are connectable to a single hose 134 through a Y-coupler or splitter 136. However, the vacuum device 10 may have multiple ports with the hoses 130, 132 being connected to separate ports. With a powerful enough vacuum device, it may also be possible to employ two or more systems 100 simultaneously in order to increase the number of pipes tested at one time.

Figure 2:
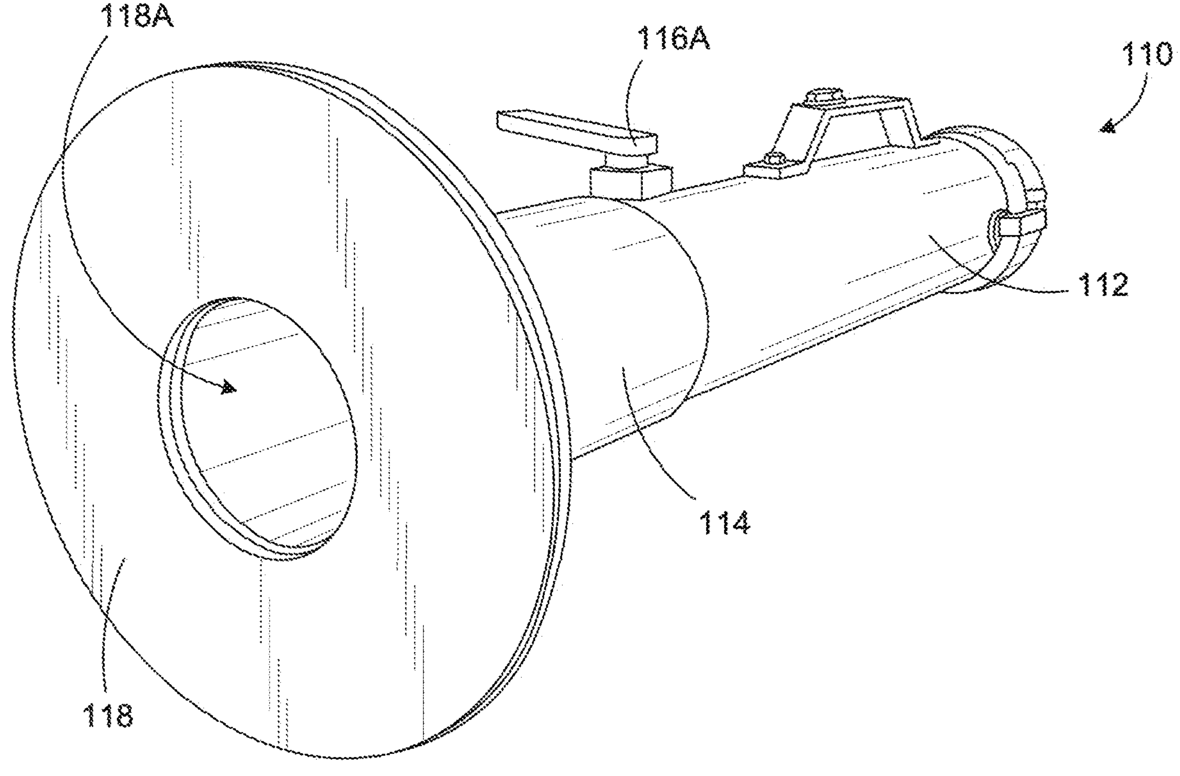
FIG. 2 is an end perspective view of an embodiment of an actuator that may be part of the drift test system of FIG. 1.

FIG. 2 is an end perspective view of an assembled actuator 110. For convenience, a handle may be secured to the top of the coupler 112. An eye bolt or similar hardware may be used to allow the operator to connect a harness to the actuator, making moving the actuator less unwieldy.

Figures 3A, 3B, 4:
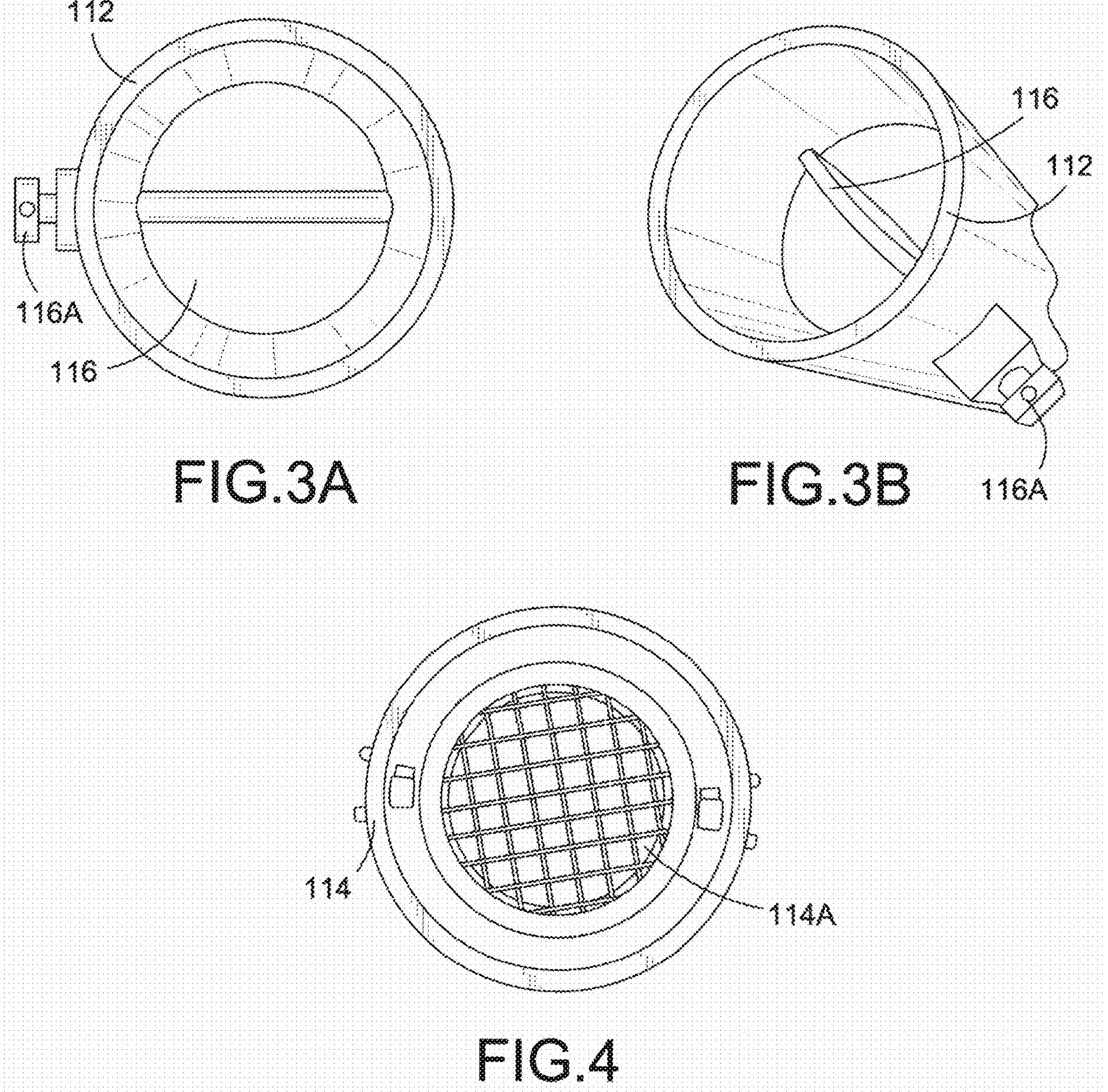
FIG. 3A is a view of the front end of the actuator of FIG. 2 with the valve in the closed position.
FIG. 3B is a view of the front end of the actuator of FIG. 2 with the valve in the open position.
FIG. 4 is a view of the rear end of the actuator of FIG. 2 showing an optional screen.

Referring to both FIG. 1 and FIG. 2, each actuator 110, 120 may include a coupler 112, 122 to connect the outer end of the actuator 110, 122 to the respective hose 130, 132, an extension tube 114, 124 securable to the opposite end of the coupler 112, 122, and a valve 116, 126, such as a butterfly valve, within either the couplers 112, 122 or the extension tubes 114, 124. Each valve 116, 126 includes a handle 116A, 126A by which an operator may change the position of the valves 116, 126 between closed and open positions (as illustrated in FIGS. 3A and 3B, respectively). Round plates 118, 128 are attachable to the inner ends of the extension tubes 114, 124. The round plates 118, 128 have a diameter that is larger than the diameter of the pipes 20, 30. An opening 128A in the plates 118, 128 has a diameter that is smaller than the diameter of the pipes 20, 30.

The couplers 112, 122 and the extension tubes 114, 124 are preferably detachable from one another for ease of transportation and storage but may instead be more permanently secured together. The plates 118, 128 may be provided in different diameters and with different diameter openings 128A so as to be usable with pipes 20, 30 of different diameters. The plates 118, 128 are preferably detachable from the extension tubes 114, 124 so that one size of the extension tubes 114, 124 may be used with plates 118, 128 of several different sizes, but again may be permanently secured.

In an alternative embodiment illustrated within the dashed circle in FIG. 1, the two hoses 130, 132 are joined at a splitter 138 in which a valve 138A is incorporated and the actuators 110, 120 do not include valves 116, 126.

An optional screen 114A may be secured inside the extension tube 114 (FIG. 4) to prevent any debris that is pushed out in front of the drift 40 from interfering with or damaging the valve 116.

Referring again to FIG. 1, to use, the hoses 130, 132 are connected to the splitter 136 (or 138, depending on the particular configuration used), which is connected to the vacuum device 10 through the single hose 134. A first operator takes the first actuator 110 to the second end 24 of the first pipe 20 and a second operator takes the second actuator 120 to the first end 34, opposite the second end 24 of the first pipe 20, of the second pipe 30. The valve 116 of the first actuator 110 is opened and the valve 126 of the second actuator 120 is closed. The vacuum device 10 is turned on, generating a vacuum force or suction through the hoses 134, 130, and 132. The plate 118 of the first actuator 110 is pressed against the second end 24 of the first pipe 20 and a drift 40 inserted into the first end 22 of the first pipe 20 (position A) is drawn through the first pipe 20 to the second end 24. When the drift 40 reaches the second end 24 (position B), the first valve 116 is closed, the actuator 110 moved away from the pipe 20, and the drift 40 removed from the second end 24.

The drift 40 is then inserted into the second end 32 of the second pipe 30 (position C), the second valve 126 of the second actuator 120 is opened, and the plate 128 of the second actuator 120 is pressed against the first end 34 of the pipe 30. Again, the drift 40 is drawn through the pipe 30 from the second end 32 to the first end 34, where it is removed (position D). The back-and-forth process is repeated until the drift 40 has passed through all of the pipes in a line to be tested. If the drift 40 is unable to pass through a pipe because of debris, internal damage, or other obstacle, that pipe is removed from the line for further inspection, cleaning, repair, or other corrective work.

It will be appreciated that two drifts may be alternately used or that, with sufficient vacuum force, two drifts may be used simultaneously on two pipes.

If the splitter 138 with the valve 138A is used instead of the individual valves 116, 126, an operator will change the position of the valve 138A each time the drift is inserted into the end of a pipe so that the suction from the vacuum device 10 is alternately directed to one actuator or the other.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system configured for testing the roundness of the inner wall of a pipe or other hollow cylinder, comprising:
- first and second actuators, each actuator comprising:
  - a coupler;
  - an extension tube securable at an outer end to an inner end of the coupler; and
  - a plate attachable to an inner end of the extension tube, the plate having an opening formed therethrough;
- at least one valve between a vacuum source and the extension tube;
- a splitter;
- a first hose connectable between the vacuum source and an inlet of the splitter;
- a second hose connectable between a first outlet of the splitter and the outer end of the coupler of the first actuator; and
- a third hose connectable between a second outlet of the splitter and the outer end of the coupler of the second actuator:
- whereby, when:
  - a drift is inserted into a first end of a pipe;
  - the plate of the first actuator is pressed against a second end of the pipe; and
  - a vacuum is applied to the first actuator;
  - the drift is drawn through the pipe from the first end towards the second end.

2. The system of claim 1, wherein the at least one valve comprises a Y-valve within the splitter, whereby the vacuum from the first hose is directable between the second hose and the third hose.

3. A system configured for testing the roundness of the inner wall of a pipe or other hollow cylinder, comprising:
- first and second actuators, each actuator comprising:
  - a coupler;
  - an extension tube securable at an outer end to an inner end of the coupler, and a plate attachable to an inner end of the extension tube, the plate having an opening formed therethrough;
- at least one valve between a vacuum source and the extension tube;
  - a first valve between the vacuum source and the extension tube of the first actuator; and
  - a second valve between the vacuum source and the extension tube of the second actuator;
  - whereby the vacuum from the vacuum source is directable between the first and second actuators when the first and second valve are alternately opened and closed.

4. The system of claim 3, further comprising:

a splitter;

a first hose connectable between the vacuum source and an inlet of the splitter;

a second hose connectable between a first outlet of the splitter and the outer end of the coupler of the first actuator; and a third hose connectable between a second outlet of the splitter and the outer end of the coupler of the second actuator.

5. A method for testing the roundness of the inner walls of a plurality of pipes or other hollow cylinders, comprising:

inserting a drift into a first end of a first pipe;

pressing a plate of a first actuator against a second end of the first pipe;

opening a first valve of the first actuator;

closing a second valve of a second actuator;

applying a vacuum to the first actuator, whereby the drift is drawn through the first pipe towards the second end of the first pipe;

inserting the drift into a second end of a second pipe;

pressing a plate of the second actuator against a first end of the second pipe;

closing the first valve of the first actuator;

opening the second valve of the second actuator; and applying a vacuum to the second actuator;

whereby the drift is drawn through the second pipe towards the first end of the first pipe.

6. The method of claim 5, further comprising, before applying the vacuum to the first actuator:

connecting a first hose between a vacuum device and an inlet of a splitter;

connecting a second hose between a first outlet of the splitter and an outer end of the coupler of the first actuator; and connecting a third hose between a second outlet of the splitter and an outer end of the coupler of the second actuator.

7. The method of claim 6, wherein the splitter comprises a Y-valve, the method further comprising:

moving the Y-valve into a first position to apply the vacuum to the first actuator and prevent the vacuum from being applied to the second actuator; and moving the Y-valve into a second position to apply the vacuum to the second actuator and prevent the vacuum from being applied to the first actuator.

* * * * *